3,681,322
ADDUCTS OF ALIPHATIC AND ARALIPHATIC ALDEHYDES AND ERYTHROMYCYLAMINE OR ERYTHROMYCYL B AMINE

Barbara S. Kitchell and Koert Gerzon, Indianapolis, Ind., assignors to Eli Lilly and Company, Indianapolis, Ind.
No Drawing. Filed Apr. 13, 1970, Ser. No. 28,145
Int. Cl. C07c 47/18
U.S. Cl. 260—210 E        7 Claims

ABSTRACT OF THE DISCLOSURE

Derivatives of erythromycylamine and erythromycyl B amine formed with aliphatic and araliphatic aldehydes are useful as antibiotics.

BACKGROUND OF THE INVENTION

Erythromycylamine and erythromycyl B amine have been prepared by the catalytic hydrogenation of erythromycin oxime, erythromycin B oxime or similar derivatives of erythromycin or of erythromycin B (see co-pending application of Gerzon and Murphy, Ser. No. 878,936, filed Nov. 21, 1969). Erythromycylamine and erythromycyl B amine both have pronounced antibiotic activity of the order of magnitude of the parent antibiotic and are effective upon either parenteral or oral administration to mice infected with susceptible Gram-positive organisms.

It is an object of this invention to provide derivatives of erythromycylamine and of erythromycyl B amine having better antibiotic activity and/or increased intestinal absorption when administered by the oral route and/or decreased side effects at comparable antibiotic dosages.

SUMMARY OF THE INVENTION

This invention provides adducts of erythromycylamine and erythromycyl B amine formed with aliphatic or araliphatic aldehydes. The adducts of this invention have structure II below and are prepared according to the following reaction scheme:

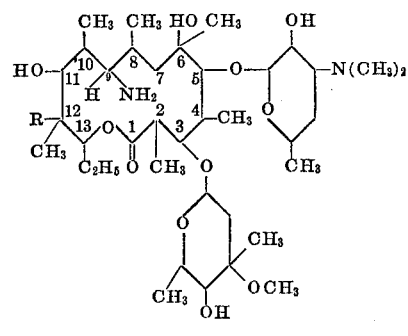

I

↓ R'CHO

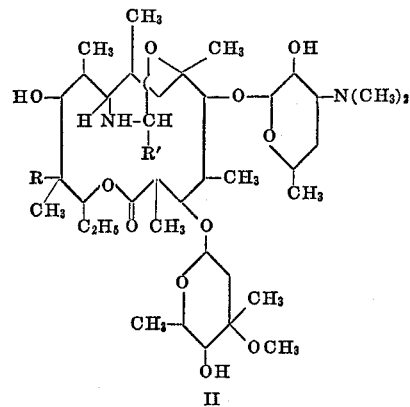

II wherein R is hydrogen or hydroxyl and R' is hydrogen, $C_1$–$C_5$ alkyl, phenyl substituted $C_1$–$C_3$ alkyl, phenyl substituted vinyl, or phenyl substituted ethinyl. Illustrative groups represented by R' include methyl, ethyl, n-propyl, isopropyl, n-butyl, isobutyl, sec-butyl, t-butyl, amyl, isoamyl, sec-amyl, 2-methyl - 1 - butyl, benzyl phenethyl, 2-phenyl - 1 - propyl, 3-phenyl - 1 - propyl, 3-phenyl-2-propyl, phenylethinyl, 2-phenylvinyl, 2,2-diphenylvinyl and the like. In Formula I above, when R is hydroxyl, erythromycylamine is represented and when R is hydrogen, erythromycyl B amine.

The structure of the adducts represented by Formula II above involves an ether linkage formed between the aldehyde reactant and one of the hydroxyls attached to the erythronolide ring. In Formula II, the ether linkage is shown with the hydroxyl at the 6-position of the erythronolide ring since this hydroxyl is presently believed to be most likely involved in bond formation with the aldehyde-amine group at 9 because of spatial consideration. However, the ether bond could possibly involve either the 11 or 12 hydroxyl.

In the case of the reaction between formaldehyde (R' is hydrogen) and erythromycylamine (R is hydroxyl) a bis-adduct is the chief product of the reaction. The most probable structure for the bis-adduct is portrayed by Formula III below:

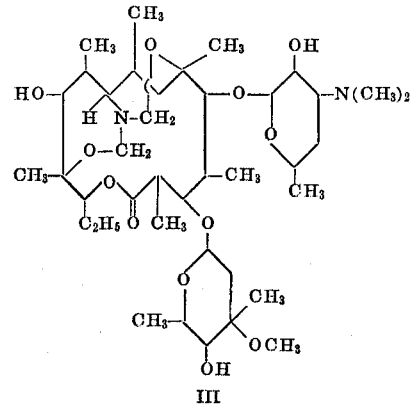

III

As can be seen from Formula III, two molecules of formaldehyde react with the amine group of erythromycylamine and two ether linkages are formed, most probably with the hydroxyls at positions 6 and 12 of the erythronolide ring, although ether formation with the hydroxyl at position 11 cannot be excluded as a possibility.

Compounds according to Formula II above are prepared by reacting the desired aldehyde with erythromycylamine or with erythromycyl B amine in an inert solvent, preferably ethanol. The reactions are carried out by stirring at room temperature for periods of 12 to 24 hours. The compounds are isolated by removing the solvents in vacuo and recrystallizing the resulting residue from ether or other similar solvent. The following are typical examples of methods of preparing the compounds of this invention.

Example I.—Erythromycylamine-acetaldehyde adduct

A reaction mixture was prepared by suspending 0.00136 mole (1.0 g.) of erythromycylamine in 25 ml. of 95 percent ethanol. A solution containing 0.0015 mole of acetaldehyde dissolved in 10 ml. of ethanol was added and the reaction mixture stirred for 24 hours. The ethanol was then removed by evaporation in vacuo and the residue comprising the erythromycylamine-acetaldehyde adduct formed in the above reaction was recrystallized from ether. The adduct had the following characteristics:

Analysis.—Calc. (percent): C, 61.55; H, 9.53; N, 3.68. Found (percent): C, 61.47; H, 9.31; N, 3.85.

Melting point: 196–197° C.
Molecular weight by mass spectrograph (m./e. value) =760.
$pK_a$ in 66 percent DMF=5.5, 8.8.

Other compounds prepared by the above procedure include the following: (molecular weights were determined by mass spectrograph (m./e. value) and $pK_a$'s were determined by standard procedures in 66 percent DMF).

Other compounds preparable by the above procedures include:
erythromycyl B amine-cinnamaldehyde adduct
erythromycyl B amine-$\beta,\beta$-diphenylacrylaldehyde adduct
erythromycyl B amine-phenylpropargylaldehyde adduct
erythromycylamine-$\beta$-phenylpropionaldehyde adduct
erythromycylamine-$\gamma$-phenylbutyraldehyde adduct
erythromycyl B amine-diethylacetaldehyde adduct
erythromycyl B amine-ethyldimethylacetaldehyde adduct
erythromycylamine-caproaldehyde adduct
erythromycylamine-isocaproaldehyde adduct
erythromycyl B amine-methyl-n-propylacetaldehyde adduct
erythromycylamine-formaldehyde adduct Erythromycylamine and erythromycyl B amine useful as starting materials in the above preparative procedures are prepared by the catalytic hydrogenation of erythromycin oxime, erythromycin B oxime or similar derivatives (see co-pending application of Gerzon and Murphy, Ser. No. 878,936, filed Nov. 21, 1969).

The compounds of this invention have in vitro or in vivo antibiotic activity comparable or superior to that shown by erythromycin, erythromycin B, erythromycylamine or erythromycyl B amine. For example, the compounds of this invention are effective in curing infections in mammals caused by Gram-positive organisms. In order to demonstrate this activity, each member of a group of mice were injected with a culture of S. pyogenes. Treated mice were given two doses of the antibiotic adduct 1 and 5 hours after infection; untreated mice were administered the pharmaceutical carrier only. Different dose levels were employed for different groups of mice in order to determine the $ED_{50}$ (dose which cures 50 percent of infected animals). Table I which follows gives the $ED_{50}$ as determined for 9 compounds coming within the scope of Formula II above. In the table, column 1 gives the name of the compound, column 2 the $ED_{50}$ by the oral route, column 3 the $ED_{50}$ by the subcutaneous route and column 4 the minimum inhibitory concentrate (mic.) in mcg./ml. for the organism determined by a routine tube assay procedure. Also included in the table is similar data for erythromycylamine for purposes of comparison.

| Adduct | M.P.,° | Analysis | | | | | | M./e. | $pK_a$ |
| --- | --- | --- | --- | --- | --- | --- | --- | --- | --- |
| | | Calcd. | | | Found | | | | |
| | | C | H | N | C | H | N | | |
| Erythromycylamine-propionaldehyde | 175–7 | 61.98 | 9.62 | 3.61 | 61.78 | 9.74 | 3.53 | 774 | 5.9, 9.05 |
| Erythromycylamine-butyraldehyde | 184–5 | 62.40 | 9.71 | 3.55 | 62.12 | 9.46 | 3.78 | 788 | 6.0, 9.2 |
| Erythromycylamine-valeraldehyde | 175–77 | 62.81 | 9.79 | 3.49 | 63.01 | 9.51 | 3.58 | 802 | 5.7, 9.2 |
| Erythromycylamine-isovaleraldehyde | 194–5 | 62.81 | 9.79 | 3.49 | 62.74 | 9.76 | 3.47 | 802 | 5.6, 9.1 |
| Erythromycylamine-phenylacetaldehyde | 211–13 | 64.56 | 9.15 | 3.35 | 64.33 | 8.88 | 3.23 | 836 | 5.4, 9.2 |
| Erythromycylamine-phenylpropargylaldehyde | 211–12 | 65.22 | 8.81 | 3.31 | 65.43 | 8.64 | 3.24 | 846 | 8.8 |
| Erythromycylamine $\beta,\beta$-diphenylacrylaldehyde | 177–9 | 67.50 | 8.72 | 3.03 | 67.51 | 8.79 | 2.98 | 924 | 4.5, 8.6 |
| Erythromycylamine-pivalylaldehyde | 100 | 62.81 | 9.79 | 3.49 | 63.00 | 9.70 | 3.77 | 802 | 5.2, 8.6 |

Erythromycyl B amine-formaldehyde adduct is prepared according to the above reaction. Other erythromycyl B amine adducts with aliphatic and araliphatic aldehydes are prepared in similar fashion.

Example II.—Erythromycylamine-bis-formaldehyde adduct

About 1 g. of erythromycylamine was suspended in 25 ml. of 95 percent ethanol. The suspension was mixed with 10 ml. of 37 percent aqueous formaldehyde. The reaction mixture was stirred for about 6 hours and the ethanol was then removed by evaporation in vacuo. Recrystallization of the resulting residue from anhydrous ethanol yielded white needles melting at about 213–215° C. Erythromycylamine-bis-formaldehyde adduct thus prepared had the following properties: M.P.=215° C.

Analysis.—Calc. (percent): C, 61.71; H, 9.28; N, 3.68. Found (percent): C, 61.75; H, 9.26; N, 3.45.

m./e.=758.
$pK_a$=5.2, 9.05.

TABLE I

| Adduct | $ED_{50}$ (mg./kg. × 2)[b] | | Tube mic., mcg./ml. |
| --- | --- | --- | --- |
| | Oral | Sc. | |
| Erythromycylamine bis-formaldehyde | 31.0 | <2.6 | 0.62 |
| Erythromycylamineacetaldehyde | 31.2 | 2.6 | 0.31 |
| Erythromycylaminepropionaldehyde | 36.4 | 1.6 | 0.31 |
| Erythromycylaminebutyraldehyde | 23.4 | 1.3 | 0.31 |
| Erythromycylaminevaleraldehyde | 26.0 | 1.6 | 0.62 |
| Erythromycylamineisovaleraldehyde | 20.8 | <2.6 | 1.25 |
| Erythromycylaminephenylacetaldehyde | 18.2 | <1.3 | 1.25 |
| Erythromycylaminephenylpropargylaldehyde | 26.0 | 1.6 | 0.62 |
| Erythromycylaminepivalylaldehyde | 9.8 | 1.0 | 0.15 |
| Erythromycylamine | 26.0 | 2.6 | 0.2 |

As can be seen from the $ED_{50}$ data presented in the above table, the compounds of this invention are equal to or better than erythromycylamine in curing S. pyogenes infections in mice when administered by the subcutaneous route and many of them are superior upon oral administration.

The erythromycylamine-aldehyde adducts of this invention are, of course, effective in vitro against both Gram-negative and Gram-positive bacteria. Table II below gives the in vitro antibiotic spectrum of erythromycylamine-acetaldehyde adduct, a typical adduct of this invention, as determined by the disc plate method using trypticase-soy agar as the culture medium. In Table II, column 1 gives the name of the test organism; and column 2, the minimum inhibitory concentration (mic.) in mcg./ml. at which erythromycylamine-acetaldehyde adduct inhibits the growth of the organism of column 1.

TABLE II

| Organism: | Mic(mcg./ml.) |
|---|---|
| Staphylococcus aureus 3055 | <10 |
| Bacillus subtilis | <10 |
| Mycobacterium avium | <10 |
| Streptococcus faecalis | <10 |
| Lactobacillus casei | <10 |
| Leuconostoc citrovorum | <10 |
| Escherichia coli No. 1 | 100 |
| Pseudomonas sp. No. 5 | 100 |
| Vibrio metschnikovii | 100 |

Other erythromycylamine and erythromycyl B amine adducts formed with aliphatic and araliphatic aldehydes have similar antibiotic spectra.

As can be seen from Tables I–II, the erythromycyl-aminealdehyde adducts of this invention have antibiotic activity against both Gram-positive and Gram-negative organisms, both in vitro and in vivo. Thus, the compounds can be used to control the population of staphylococci or streptococci present on equipment, furnishings, walls and floors in dental and medical offices and in hospitals. For such use the erythromycylamine-aldehyde adduct is dissolved in water, preferably with the addition of a surface active agent, an the solution applied to the surfaces as an ordinary wash solution. The erythromycylamine-aldehyde adducts can also be used for treating infections in mammals and birds caused by various microorganisms; and, when so used, the methods employed for the administration of erythromycin, its salts or its derivatives to both animals and man can be adapted directly for the use of the erythromycylamine-aldehyde adducts; that is to say, the adducts can be used to treat infections caused by pathogenic microorganisms such as the staphylococci, pneumococci, streptococci (including hemolytic streptococci) and also strains of Neisseria, Hemphilus, Corynebacterium, Brucella and Clostridium. When employed to treat infections in mammals or birds, the erythromycylamine-aldehyde adducts are administered in dosages ranging from 0.5 to 2 g. per day in divided dosages.

The adducts are administered to mammals usually by the oral route either in the form of capsules or tablets, either of which pharmaceutical forms can be prepared by the methods used to prepare similar pharmaceutical forms for erythromycin itself. The adducts of this invention are virtually devoid of any tendency to induce abnormal liver function and they cause little or no increase in intestinal motility as compared with erythromycin or its salts.

We claim:
1. A compound of the formula

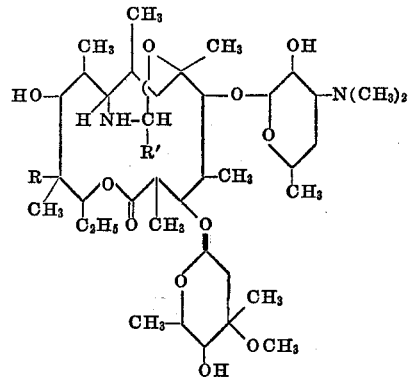

wherein R is hydrogen or hydroxyl and R' is hydrogen, $C_1$–$C_5$ alkyl, phenyl substituted $C_1$–$C_3$ alkyl, phenyl substituted vinyl, or phenyl substituted ethinyl.

2. A compound according to claim 1, said compound being erythromycylamine-acetaldehyde adduct.

3. A compound according to claim 1, said compound being erythromycylamine-phenylacetaldehyde adduct.

4. A compound according to claim 1, said compound being erythromycylamine-pivalyaldehyde adduct.

5. A compound according to claim 1, said compound being erythromycylamine-butyraldehyde adduct.

6. A compound according to claim 1, said compound being erythromycylamine-phenylpropargylaldehyde adduct.

6. A compound according to claim 1, said compound being erythromycylamine-phenylpropargylaldehyde adduct.

7. Erythromycin-bis-formaldehyde adduct.

References Cited
UNITED STATES PATENTS

| 3,417,077 | 12/1968 | Murphy et al. | 260—210 E |
| 3,478,014 | 11/1969 | Djokic et al. | 260—210 E |

LEWIS GOTTS, Primary Examiner

J. R. BROWN, Assistant Examiner

U.S. Cl. X.R.

424—180